US010044529B2

(12) United States Patent
Chou et al.

(10) Patent No.: US 10,044,529 B2
(45) Date of Patent: Aug. 7, 2018

(54) TIME-DOMAIN EQUALIZER AND SIGNAL PROCESSING METHOD THEREOF

(71) Applicant: MStar Semiconductor, Inc., Hsinchu Hsien (TW)

(72) Inventors: Yu-Shen Chou, Hsinchu Hsien (TW); Fong-Shih Wei, Hsinchu Hsien (TW); Ko-Yin Lai, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/795,374

(22) Filed: Oct. 27, 2017

(65) Prior Publication Data

US 2018/0176046 A1    Jun. 21, 2018

(30) Foreign Application Priority Data

Dec. 21, 2016   (TW) .............................. 105142447 A

(51) Int. Cl.
  *H03H 7/30*    (2006.01)
  *H04L 25/03*   (2006.01)

(52) U.S. Cl.
  CPC ............. *H04L 25/03019* (2013.01); *H04L 2025/03636* (2013.01)

(58) Field of Classification Search
  CPC .. H04B 7/0667; H04B 10/6971; H04B 3/237; H04L 25/03057; H04L 2025/03445;
  (Continued)

(56) References Cited

U.S. PATENT DOCUMENTS 5,650,954 A * 7/1997 Minuhin .......... G11B 20/10009
                                                    708/819
2006/0146925 A1* 7/2006 Birru ................. H03H 21/0027
                                                    375/233

(Continued)

*Primary Examiner* — Khanh C Tran
(74) *Attorney, Agent, or Firm* — Edell, Shapiro & Finnan, LLC

(57) ABSTRACT

A time-domain equalizer includes a delay circuit, a weighting circuit, a controller and a summation circuit. The delay circuit receives an equalized signal and accordingly generates M delayed signals for an equalized signal. The weighting circuit applies an $m^{th}$ weighting of M weightings to an $m^{th}$ delayed signal of the M delayed signals to generate an $m^{th}$ weighted signal. The summation circuit sums up the M weighted signals, according to which the equalized signal is updated. The controller iteratively updates the M weightings according to a vector $\vec{e}_{n,p}=[e_{n,p,1} \ldots e_{n,p,M}]$, where the symbol $e_{n,p,j}$ is defined as $e_{n,p,j}=\Sigma_k(z[k]^*z[k-D_{p,j}]^*)$, the symbol n is an iteration index, k is a sample index, z[k] is a $k^{th}$ sample of the equalized signal, j is an integer index between 1 and M, and $D_{p,j}$ represents a time delay amount corresponding to a $j^{th}$ delayed signal of the M delayed signals.

6 Claims, 5 Drawing Sheets

(58) Field of Classification Search
CPC ..... H04L 2025/0349; H04L 2025/0361; H04L 25/03019; H04L 2025/03636; H04L 25/0202; H04L 25/03878; H04L 27/01; G11B 20/10046

See application file for complete search history.

(56) References Cited

U.S. PATENT DOCUMENTS

| | | | |
|---|---|---|---|
| 2007/0064824 A1* | 3/2007 | Wang | H04L 25/03006 375/260 |
| 2013/0208782 A1* | 8/2013 | Agrawal | H04L 27/01 375/233 |
| 2013/0315320 A1* | 11/2013 | McGowan | H04L 27/2614 375/260 |
| 2015/0163015 A1* | 6/2015 | Katayama | H04L 1/0054 375/285 |
| 2016/0359646 A1* | 12/2016 | Iqbal | H04L 25/03159 |

* cited by examiner

TIME-DOMAIN EQUALIZER AND SIGNAL PROCESSING METHOD THEREOF

This application claims the benefit of Taiwan application Ser. No. 105142447, filed Dec. 21, 2016, the subject matter of which is incorporated herein by reference.

BACKGROUND OF THE INVENTION

Field of the Invention

The invention relates in general to a time-domain equalizer, and more particularly, to a method for determining a weighting coefficient in a time-domain equalizer.

Description of the Related Art

Orthogonal frequency-division multiplexing (OFDM) technologies, featuring high spectrum utilization efficiency and simple hardware structures, are extensively applied in communication systems. An OFDM signal is consisted of multiple symbols. To prevent echo signals in a multipath from causing inter-symbol interference (ISI), a guard interval is provided at a front end of each symbol. However, in a more complex communication environment, a propagation delay may still last longer than the length of the guard interval, resulting in ISI and degraded overall system performance. Such issue cannot be resolved by frequency-domain equalizer technologies, and an additional time-domain equalizer is necessary before the frequency-domain equalizer of a receiver to eliminate or minimize the echo signals in a received signal.

Assume that an original signal transmitted from a transmitter is represented by a symbol x and a signal received at a receiver is represented by a symbol y. Without considering timing offset and frequency offset, the received signal y via multipath propagation may be represented as follows:

$$y[k] = x[k] + \sum_{p=1}^{P} \alpha_p e^{j\theta_{p,k}} x[k-\Delta_p] + n[k] \quad (1)$$

In equation (1), k represents a sample index, x[k] represents a $k^{th}$ sample of the original signal x, y[k] represents a $k^{th}$ sample of the received signal k, n[k] represents a $k^{th}$ sample of a noise signal. As seen from equation (1), the received signal y is a sum of the original signal x and P echo signals. The positive integer P represents the total number of echo signals caused by a multipath transmission between the transmitter and the receiver. The receiver may obtain the value P by analyzing the received signal y. The symbols $\alpha_p$, $\theta_{p,k}$, and $\Delta_p$ respectively represent a magnitude amplification ratio, a phase offset and an arrival time offset of a $p^{th}$ echo signal of the P echo signals (where p is an integer index between 1 and P) relative to the original signal x.

FIG. 1(A) shows a function block diagram of a time-domain equalizer. A time-domain equalizer 100 includes P similar signal generating circuits (denoted as $110_1$, $110_2$, ..., and $110_P$, collectively referred to as an approximate signal generating circuit 110), and a subtraction circuit 120. After the receiver has determined the value of P, the time-domain equalizer 100 is configured to include P approximate signal generating circuits 110. Each approximate signal generating circuit 110 is assigned to correspond to an echo signal in the P echo signals, and is in charge of generating an approximate signal s substantially the same to that echo signal. The subtraction circuit 120 receives the P approximate signals, which are generated from subtracting the P approximate signals from the received signal y, and the output signal z is the equalized signal. As the P approximate signals s are more similar to the respective corresponding echo signals, the equalized signal z gets closer to the original signal x.

How the approximate signal generating circuit $110_p$ corresponding to the $p^{th}$ echo signal generates the approximate signal s is described below. FIG. 1(B) shows a function block diagram of the approximate signal generating circuit $110_p$, which includes a delay circuit $111_p$, a weighting circuit $112_p$ and a summation circuit $113_p$.

The delay circuit $111_p$ includes M delay elements (denoted as $L_{p,1}$, $L_{p,2}$, ... and $L_{p,M}$), each of which has an output end being a tapping node. M is a positive integer greater than 1, and m is an integer index between 1 and M. The delay circuit $111_p$ generates M different delayed signals for the equalized signal z by using the M delay elements. An $m^{th}$ tapping node in the M tapping nodes has a time delay amount $D_{p,m}$ at an input node of the delay circuit $111_p$. In other words, the output end of the delay element $L_{p,m}$ provides a delayed signal $z[k-D_{p,m}]$.

The weighting circuit $112_p$ includes M multipliers (denoted as $112_{p,1}$, $112_{p,2}$, ... and $112_{p,M}$), in which the $m^{th}$ multiplier $112_{p,m}$ multiplies the delayed signal $z[k-D_{p,m}]$ by an $m^{th}$ weighting $w_{p,m}$ to generate a weighted signal. The M weighted signals are summed by the summation circuit $113_p$, with a summation result represented as:

$$s_p = \sum_{m=1}^{M} w_{p,m} z[k-D_{p,m}] \quad (2)$$

According to the structures depicted in FIG. 1(A) and FIG. 1(B), the output signal z of the time-domain equalizer 100 may be represented as:

$$z[k] = y[k] - \sum_{p=1}^{P} \sum_{m=1}^{M} w_{p,m} z[k-D_{p,m}] \quad (3)$$

SUMMARY OF THE INVENTION

A time-domain and a signal processing method provided by the present invention define a new cost function, and computes on the basis of the least mean square (LMS) algorithm, so as to accordingly identify, from weighting circuits of a time-domain equalizer, a weighting $w_{p,m}$ that most effectively eliminates echo signals, and further solve the issue of ISI at a receiver.

According to an embodiment of the present invention, a time-domain equalizer includes a delay circuit, a weighting circuit, a controller and a summation circuit. The delay circuit receives an equalized signal, and accordingly generates M delayed signals, where M is a positive integer greater than 1. The weighting circuit adopts M weightings, and applies an $m^{th}$ weighting of the M weightings to an $m^{th}$ delayed signal of the M delayed signals to generate an $m^{th}$ weighted signal, where m is an integer index between 1 and M, wherein M weighted signals are generated accordingly. The summation circuit sums up the M weighted signals, according to which the equalized signal is updated. The controller iteratively updates the M weightings according to a vector $\vec{e}_{n,p} = [e_{n,p,1} \ldots e_{n,p,M}]$, where the symbol $e_{n,p,j}$ is defined as $e_{n,p,j} = \sum_k (z[k]^* z[k-D_{p,j}]^*)$, n represents an iteration index, k represents a sample index, z[k] is a $k^{th}$ sample of the equalized signal, j is an integer index between 1 and M, $D_{p,j}$ represents a $j^{th}$ delay amount corresponding to a $j^{th}$ delayed signal of the M delayed signals.

According to another embodiment of the present invention, a signal processing method includes following steps. M delayed signals of an equalized signal are generated, where M is a positive integer greater than 1. M weightings are adopted, and an $m^{th}$ weighting of the M weightings is applied to an $m^{th}$ delayed signal of the M delayed signals to generate an mth weighted signal, where m is an integer index between 1 and M. The M weighted signals are summed up to update the equalized signal. In the signal processing method, the M weightings are iteratively updated according to a vector $\vec{e}_{n,p}=[e_{n,p,1} \ldots e_{n,p,M}]$, where the symbol $e_{n,p,j}$ is defined as $e_{n,p,j}=\Sigma_k(z[k]*z[k-D_{p,j}]*)$, n represents an iteration index, k represents a sample index, z[k] is a $k^{th}$ sample of the equalized signal, j is an integer index between 1 and M, $D_{p,j}$ represents a $j^{th}$ delay amount corresponding to a $j^{th}$ delayed signal of the M delayed signals.

The above and other aspects of the invention will become better understood with regard to the following detailed description of the preferred but non-limiting embodiments. The following description is made with reference to the accompanying drawings.

Figure 1A:
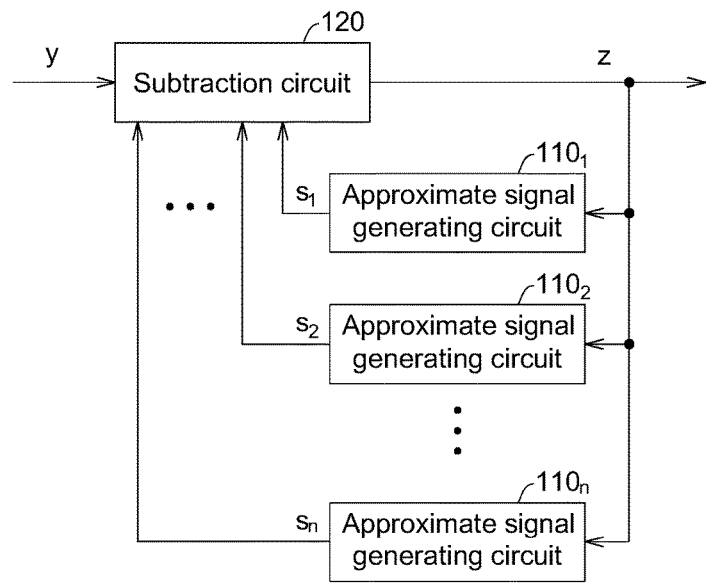
FIG. 1(A) (prior art) is a function block diagram of a time-domain equalizer.

It should be noted that the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

In a time-domain equalizer and a signal processing method provided by the present invention, a new cost function is defined, and computation is performed on the basis of a least mean square (LMS) method to accordingly identify a weighting most capable of effectively eliminating echo signals for each weighting circuit in the time-domain equalizer.

Figure 1B:
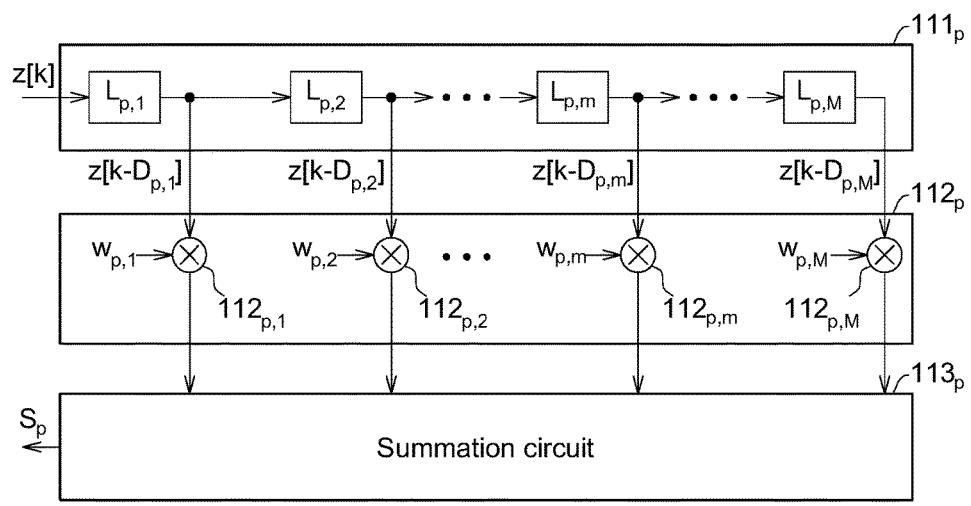
FIG. 1(B) is a function block diagram of a similar signal generating circuit in a time-domain equalizer.

The concept of the present invention applied to the time-domain equalizer 100 shown in FIG. 1(A) and FIG. 1(B) is first discussed below. As previously stated, the output signal z of the time-domain equalizer 100 may be represented as:

$$z[k]=y[k]-\Sigma_{p=1}^{P}\Sigma_{m=1}^{M}w_{p,m}z[k-D_{p,m}] \quad (3)$$

One design target of the time-domain equalizer 100 of the present invention is to select appropriate time delay amount $D_{p,m}$ and weighting $w_{p,m}$ for the approximate signal generating circuit $110_p$, such that an approximate signal $s_p$ can be as approximate to the $p^{th}$ echo signal as possible, so as to have the equalized signal z generated by the time-domain equalizer 100 in equation (3) be close to the original signal x, i.e., the influence of echo signals is eliminated.

A method adopted for determining the time delay amount $D_{p,m}$ is described below. In practice, through fast Fourier transform (FFT), a receiver where the time-domain equalizer is located can estimated an approximate value (represented by $D_p$) of an actual arrival time delay $\Delta_p$; however, it is difficult to calculate an accurate difference between the actual arrival time delay $\Delta_p$ and the approximate delay $D_p$. In the embodiment of the present invention, after learning the approximate delay $D_p$ (a calculating method thereof being prior art), the time delay amount of each of the M delay elements included in the delay circuit $111_p$ can be configured according to the approximate delay $D_p$. For example, a circuit designer may select a reasonable lower difference threshold $\tau_{min}$ and a reasonable upper difference threshold $\tau_{max}$ based on experience. More specifically, the arrival time delay $\Delta_p$ is assumed to fall within the range from $(D_p-\tau_{min})$ to $(D_p+\tau_{max})$, and the time delay amounts, provided by the M delay elements, may be selected from this range. Taking M equal to 8 for example, if the time delay amount $D_{p,m}$ provided by the delay element $L_{p,m}$ is presented as $(D_p+d_{p,m})$, the time delay $(D_p+d_{p,1})$ provided by the delay element $L_{p,1}$ may be set as $(D_p-\tau_{min})$, the time delay amount $(D_p+d_{p,8})$, provided by the delay element $L_{p,8}$ may be set as $(D_p+\tau_{max})$, and the other six time delay amounts $(D_p+d_{p,2})$ to $(D_p+d_{p,7})$ may be set as equidistantly interpolated results between $(D_p-\tau_{min})$ and $(D_p+\tau_{max})$.

The method for determining the weighting $w_{p,m}$ provided by the present invention is described below. A cost function is defined for $p^{th}$ echo signal in P echo signals as below:

$$e_{n,p}^2=\Sigma_{j=1}^{M}e_{n,p,j}^2 \quad (4)$$

In equation (4), n represents an iteration index, j is an integer index between 1 and M, the $e_{n,p,j}$ represents a correlation factor and is defined as:

$$e_{n,p,j}=\Sigma_k(z[k]*z[k-D_{p,j}]*) \quad (5)$$

In equation (5), the delay amount $D_{p,j}$ may also be rewritten as $(D_p+d_{p,j})$, and the symbol $D_p$ is the foregoing approximate delay.

The effect of equation (5) is calculating the correlation between the equalized signal z and its delayed signal, and summing the accumulated correlation results (e.g., summing 5000 consecutive correlation results corresponding to the sample index k). Ideally, the time-domain equalizer substantially eliminates the echo signals in the received signal y, i.e., causing the output signal z of the equalizer 100 to be substantially the same to the original signal x. Theoretically, if beginning and end sections of the original signals x are not temporally correlated, the correlation of the original signal and its delayed signal approximates zero. Accordingly, the correlation between the ideal equalized signal z and its delayed signal also approximates zero. In conclusion, the more ideal a time-equalizer is, the calculation result of equation (5) approaches more to zero, also the smaller the calculation result of equation (4) becomes. The time-domain equalizer of the present invention is designed to iterate by using the LMS algorithm to identify the weighting $w_{p,m}$ that minimizes the cost function $e_{n,p}^2$. The calculation and implementation details are given below.

First of all, equation (1) is substituted into equation (3), and the symbol of the weighting $w_{p,m}$ is replaced by $w_{n,p,m}$ (having denoted the iteration index n), and equation (3) is re-written as below:

$$z[l]=x[k]+\Sigma_{p=1}^{P}\alpha_p e^{j\theta_p,k}x[k-\Delta_p]+n[k]-\Sigma_{p=1}^{P}\Sigma_{m=1}^{M}w_{n,p,m}z[k-D_{p,m}] \quad (6)$$

In equation (6), the delay amount $D_{p,m}$ can also be re-written as $(D_p+d_{p,m})$, and the symbol $(D_p+d_{p,m})$ is the foregoing approximate delay $D_p$.

Equation (6) is substituted into the expression $z[k]*z[k-D_{p,j}]^*$:

$$
\begin{aligned}
&z[k]*z[k-D_{p,j}]^* \\
&= (x[k] + \Sigma_{p=1}^P \alpha_p e^{j\theta_{p,k}} x[k-\Delta_p]) * z[k-D_{p,j}]^* + \\
&\quad n[k] z[k-D_{p,j}]^* \\
&\quad -\Sigma_{p=1}^P \Sigma_{m=1}^M w_{n,p,m} z[k-D_{p,m}]^* z[k-D_{p,j}]^* \\
&= (x[k] + \Sigma_{p=1}^P \alpha_p e^{j\theta_{p,k}} x[k-\Delta_p]) \\
&\quad * (x[k-D_{p,j}] + \Sigma_{p=1}^P \alpha_p e^{j\theta_{p,k}} x[k-(D_{p,j}+\Delta_p)]) + n[k-D_{p,j}] \\
&\quad - \Sigma_{p=1}^P \Sigma_{m=1}^M w_{n,p,m} z[k-(D_{p,m}+D_{p,j})])^* \\
&\quad + n[n] z[k-D_{p,j}]^* - \Sigma_{p=1}^P \Sigma_{m=1}^M w_{n,p,m} z[k-D_{p,m}]^* z[k-D_{p,j}]^*
\end{aligned}
\quad (7)
$$

It is assumed that the beginning and end sections of the original signal x are not temporarily correlated and have an average value of zero. Further, it is also assumed that the average value of noise signal is zero. If equation (7) is substituted into equation (5), after accumulating for a period of time, the accumulation values of some terms in equation (7) approximate zero, such that the calculation result of equation (5) can be simplified to approximate:

$$
e_{n,p,j} \approx \Sigma_k (\alpha_p e^{j\theta_{p,k}} x[k-\Delta_p] x[k-D_{p,j}]^* - \Sigma_{m=1}^M w_{n,p,m} z[k-D_{p,m}]^* z[k-D_{p,j}]^*) \quad (8)
$$

According to the concept of the LMS algorithm, partial differentiation is performed on equation (4) by using the weightings $w_{n,p,m}$ as partial derivatives to obtain the weighting $w_{n,p,m}$ that minimizes the cost function $e_{n,p}^2$. By introducing equation (8) during the partial differentiation, it is obtained that:

$$
\begin{aligned}
\frac{\partial e_{n,p}^2}{\partial w_{n,p,m}} &= \sum_{j=1}^M \frac{\partial e_{n,p,j}^2}{\partial w_{n,p,m}} = \sum_{j=1}^M 2 e_{n,p,j} \frac{\partial e_{n,p,j}}{\partial w_{n,p,m}} \\
&= \sum_{j=1}^M -2 e_{n,p,j} * (\Sigma_k z[k-D_{p,m}] * z[k-D_{p,j}]^*) \\
&= -2 \vec{e}_{n,p} * \vec{z}_{n,p,m}^T
\end{aligned}
\quad (9)
$$

In the above equation, the vector $\vec{e}_{n,p} = [e_{n,p,1} \ldots e_{n,p,M}]$ (refer to equation (5) for its definition), and the vector $\vec{z}_{n,p,m}$ is:

$$
[\Sigma_k z[k-D_{p,m}]^* z[k-D_{p,1}]^* \ldots \Sigma_k z[k-D_{p,m}]^* z[k-D_{p,M}]^*] \quad (10)
$$

According to the deduced results of the LMS algorithm and equation (9), the weighting $w_{n,p}$ can be updated by using the following equation, thus gradually minimizing the cost function $e_{n,p}^2$:

$$
\vec{w}_{n+1,p} = \begin{bmatrix} w_{n+1,p,1} \\ \vdots \\ w_{n+1,p,M} \end{bmatrix} = \vec{w}_{n,p} - \mu \nabla e_{n,p}^2 = \begin{bmatrix} w_{n,p,1} \\ \vdots \\ w_{n,p,M} \end{bmatrix} + 2\mu \begin{bmatrix} \vec{e}_{n,p} \vec{z}_{n,p,1}^T \\ \vdots \\ \vec{e}_{n,p} \vec{z}_{n,p,M}^T \end{bmatrix} \quad (11)
$$

In equation (11), $\mu$ represents an adjustable parameter in the LMS algorithm, is associated with the speed of iteration, and can be determined by a circuit designer instead of being limited to a predetermined value.

Figure 2:
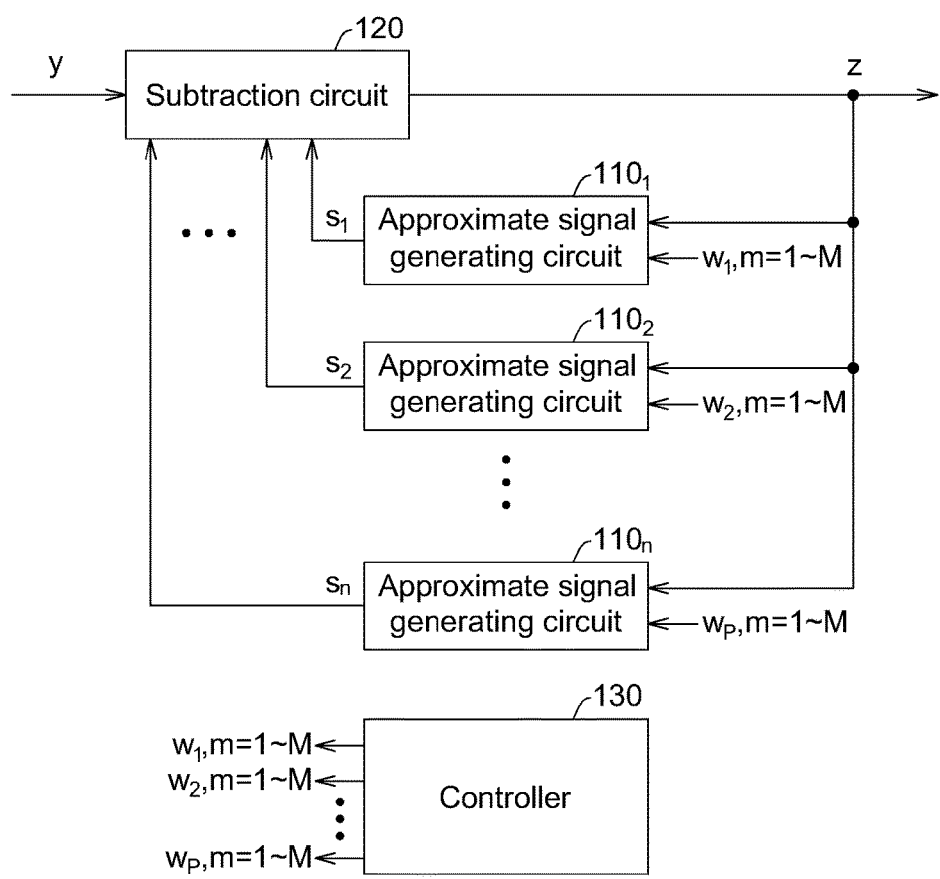
FIG. 2 is a function block diagram of a time-domain equalizer according to an embodiment of the present invention.

As shown in FIG. 2, if the concept of the present invention is applied to the time-domain equalizer in FIG. 1(A) and FIG. 1(B), the time-domain equalizer 100 may include a controller 130, which determines the vector $\vec{e}_{n,p} = [e_{n,p,1} \ldots e_{n,p,M}]$ in the cost function $e_{n,p}^2$, and accordingly iteratively updates the weighting $w_{n,p}$ used in the weighting circuits 112 in the similar signal generating circuit 110.

Figure 3:
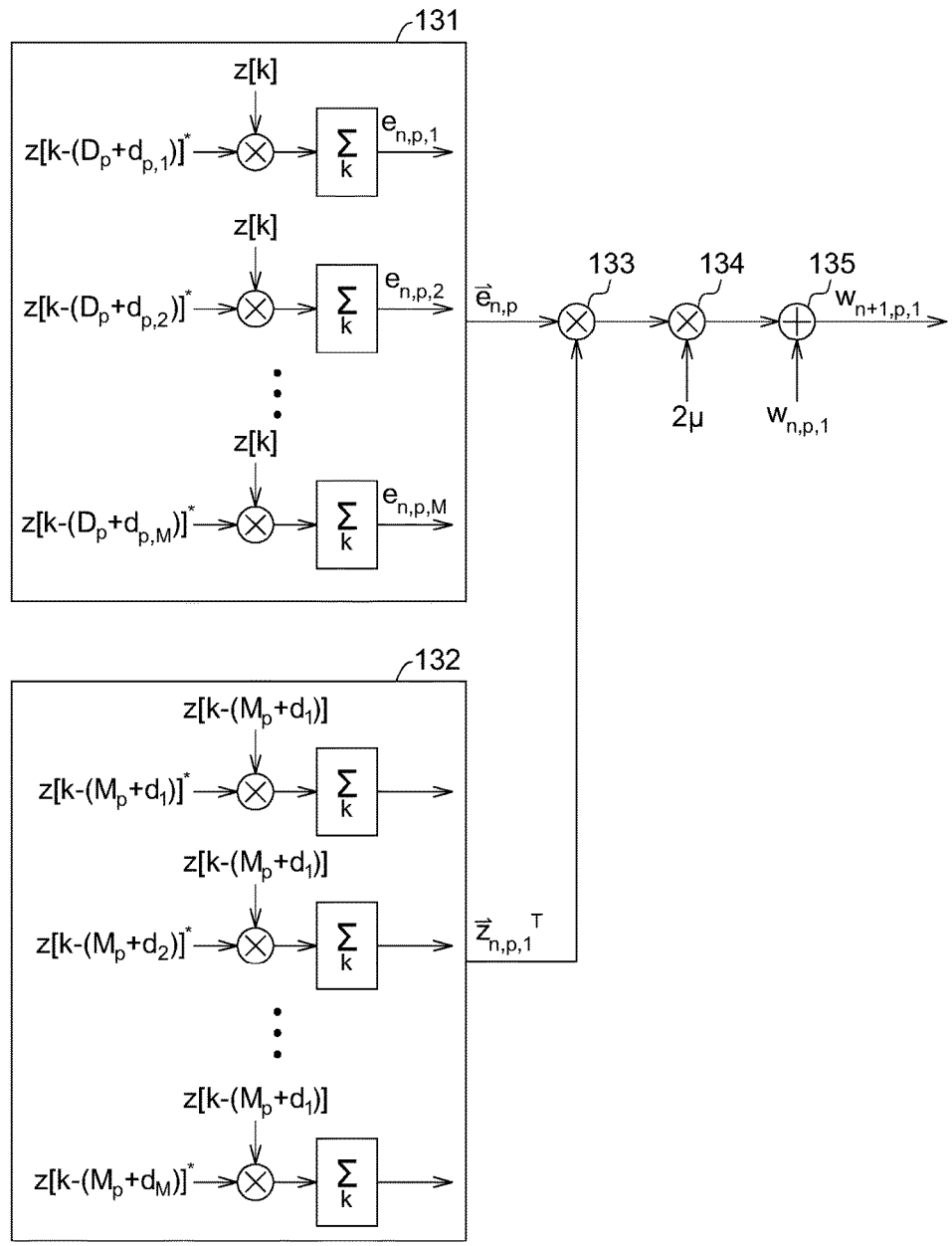
FIG. 3 and FIG. 4 are partial function block diagrams of a controller according to the present invention.

In an embodiment, the controller 130 updates the weighting $w_{n,p}$ according to equation (11). More specifically, the controller 130 may first calculate the vector $\vec{e}_{n,p}$ and the vector $\vec{z}_{n,p,m}$, and then multiply the product of the vector $\vec{e}_{n,p}$ and the vector $\vec{z}_{n,p,m}^T$ by $2\mu$ to obtain the last term in equation (11). By adding this term with the current weighting $\vec{w}_{n,p}$, an updated weighting $\vec{w}_{n+1,p}$ is generated. FIG. 3 shows a partial function block diagram of the controller 130 of this embodiment, illustrating how calculation is performed by using the signal z[k] and the delayed signal $z[k-D_{p,j}]$ generated by the delay circuit $111_p$ to update the weighting $w_{n,p,1}$ of the first multiplier (m=1) in the weighting circuit $112_p$ to $w_{n+1,p,1}$. A calculation circuit 131 performs calculation corresponding to equation (5) to determine the vector $\vec{e}_{n,p}$. A calculation circuit 132 performs calculation corresponding to equation (10) to determine the vector $\vec{z}_{n,p,m}^T$. A multiplier 133 multiplies output signals of the calculation circuits 131 and 132. A multiplier 134 multiples an output signal of the multiplier 133 by $2\mu$. An adder 135 adds an output signal of the multiplier 134 and the weighting $\vec{w}_{n,p}$. In practice, the calculation circuits 131 and 132 may receive the delayed signal $z[k-D_{p,j}]$, generated by the delay circuit $111_p$, as its input signal.

One person can understand that, without departing from the spirit of the present invention, there are numerous other circuit configurations for implementing the controller 130. In practice, the controller may be realized by using various control and processing platforms, including fixed and programmable logic circuits, e.g., programmable logic gate arrays, application-specific integrated circuits, microcontrollers, microprocessors, and digital signal processors. Further, the controller 130 may be designed to complete its task through executing a processor command stored in a memory. It should be noted that, processing details of delay, vector transpose, addition, multiplication and summation are generally known to one person skilled in the art, and shall be omitted herein.

In addition to the typical LMS algorithm, the time-domain equalizer of the present invention may also determine the weighting $w_{n,p,m}$ capable of minimizing the cost function $e_{n,p}^2$ by variations of the time-domain equalizer. Taking the improved proportionate normalized least mean square (IPN-LMS) algorithm for example, the controller 130 may determine the M parameters $[k_{n,p,1} \ldots k_{n,p,M}]$ for adaptively adjusting the vector $\vec{e}_{n,p}$ and the vector $\vec{z}_{n,p,m}^T$ further according to the weighting $[w_{n,p,1} \ldots w_{n,p,M}]$; that is, iteratively updating the weighting $w_{n,p}$ according to an equation below:

$$
\vec{w}_{n+1,p} = \begin{bmatrix} w_{n+1,p,1} \\ \vdots \\ w_{n+1,p,M} \end{bmatrix} = \begin{bmatrix} w_{n,p,1} \\ \vdots \\ w_{n,p,M} \end{bmatrix} + \mu \begin{bmatrix} k_{n,p,1} \vec{e}_{n,p} \vec{z}_{n,p,1}^T \\ \vdots \\ k_{n,p,M} \vec{e}_{n,p} \vec{z}_{n,p,M}^T \end{bmatrix} \quad (12)
$$

The M parameters $[k_{n,p,1} \ldots k_{n,p,M}]$ are generated according to an equation below:

$$\alpha_{n,p,l} = \begin{cases} -0.5, & |w_{n,p,l}| > 0.1 * \max(|w_{n,p,l}|) \\ +0.5, & |w_{n,p,l}| \leq 0.1 * \max(|w_{n,p,l}|) \end{cases} \quad (13)$$

$$k_{n,p,l} = \frac{1 - \alpha_{n,p,l}}{2M} + (1 + \alpha_{n,p,l})\frac{|w_{n,p,l}|}{2\|w_{n,p,l}\| + \varepsilon} \quad (14)$$

In equation (14), $\varepsilon$ is an adjustable parameter in the IPNLMS, and l is an integer index between 1 and M.

$$\|w_{n,p,l}\| = \sum_{l=1}^{M} |w_{n,p,l}| \quad (15)$$

Figure 4:
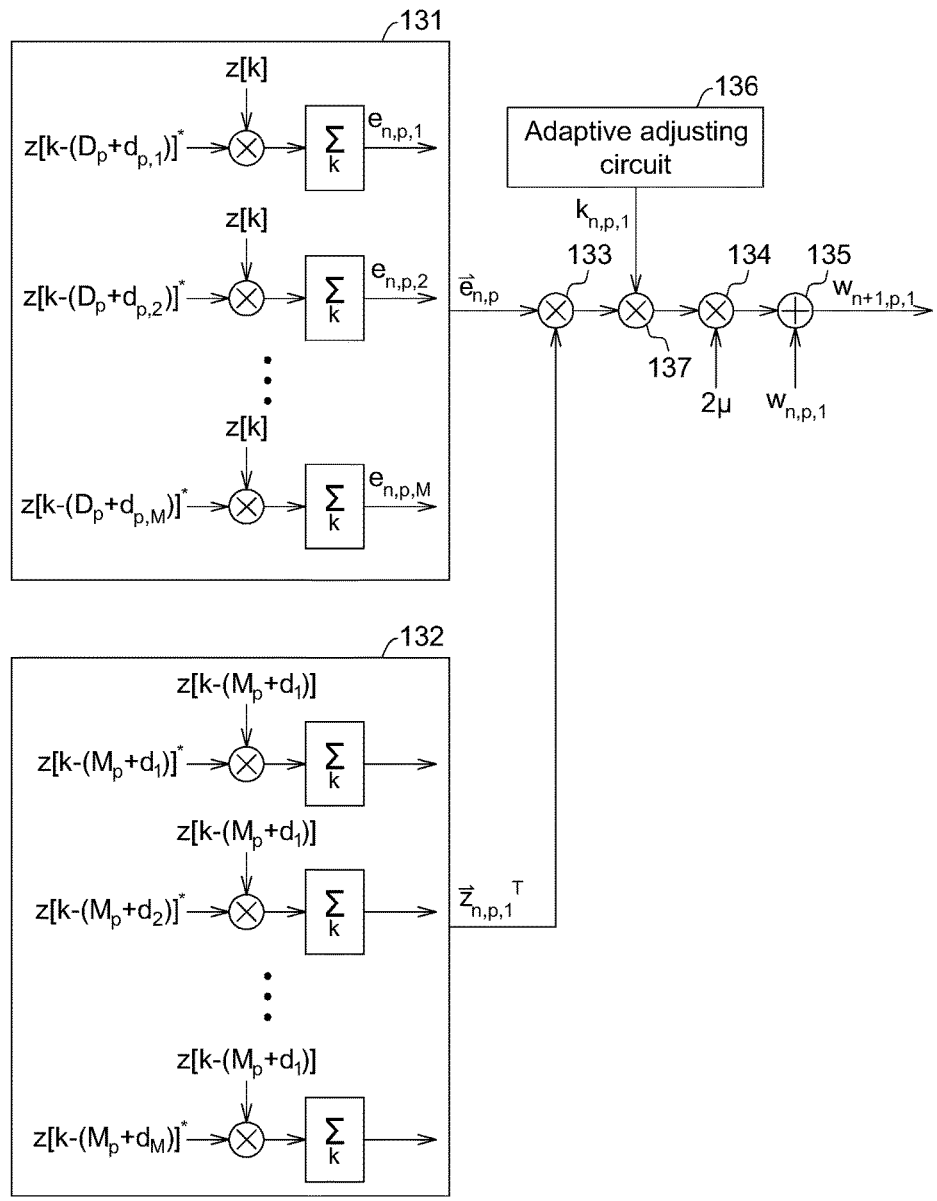

As shown in FIG. 4, the controller 130 further includes an adaptive adjusting circuit 136 and a multiplier 137. The adaptive adjusting circuit 136 generates the above parameters $[k_{n,p,1} \ldots k_{n,p,M}]$. The multiplier 137 multiplies the parameter $k_{n,p,1}$ generated by the adaptive adjusting circuit 136 by the input signal of the multiplier 133, so as to adaptively adjust the vector $\vec{e}_{n,p}$ and the vector $\vec{z}_{n,p,m}^T$.

Figure 5:
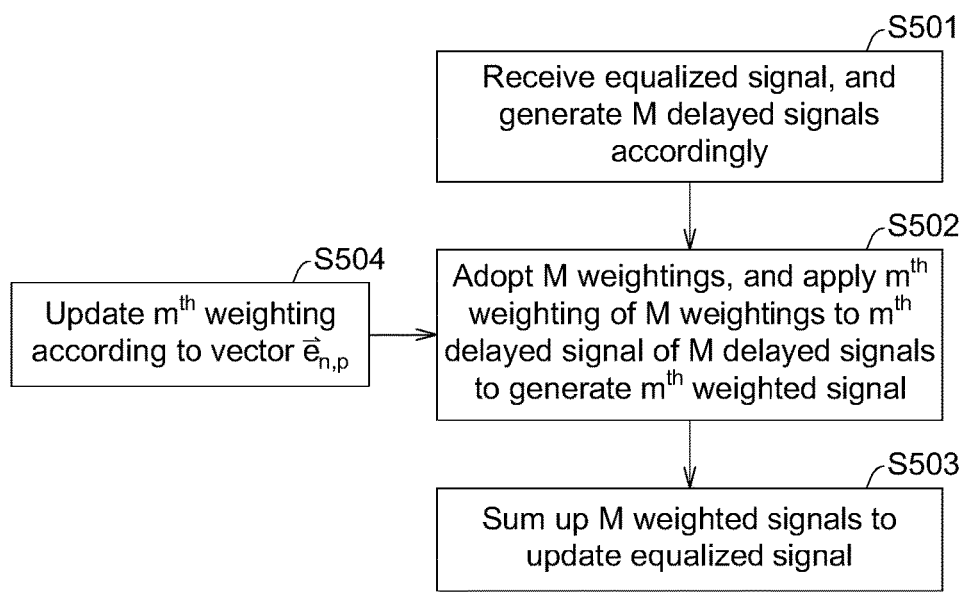
FIG. 5 is a flowchart of a signal processing method according to an embodiment of the present invention.

FIG. 5 shows a flowchart of a signal processing method according to another embodiment of the present invention. In step S501, an equalized signal is received, and M delayed signals are generated accordingly, where M is a positive integer greater than 1. In step S502, M weightings are adopted, and an $m^{th}$ weighting of the M weightings is applied to an $m^{th}$ delayed signal of the M delayed signals to generate an $m^{th}$ weighted signal, where m is a positive integer between 1 and M. In step S503, the M weighted signals are summed up to update the equalized signal. In step S504, the M weightings used in the step S502 are iteratively updated according to the vector $e_{n,p}=[e_{n,p,1} \ldots e_{n,p,M}]$, where the symbol $e_{n,p,j}$ is defined as:

$$e_{n,p,j}=\Sigma_k(z[k]*z[k-D_{p,j}]*) \quad (16)$$

In equation (16), n represents an iteration index, k represents a sample index, z[k] is a $k^{th}$ sample of the equalized signal, j is an integer index between 1 and M, and $D_{p,j}$ represents a $j^{th}$ time delay amount corresponding to a $j^{th}$ delayed signal of the M delayed signals.

One person skilled in the art can understand that the operation variations applied to the time-domain equalizer 100 are applicable to the signal processing method in FIG. 5, and shall be omitted herein.

It should be noted that, the mathematical expressions in the disclosure are for explaining principles and logics associated with the embodiments of the present invention. Unless otherwise specified, these mathematical expressions do not form limitations on the present invention. One person skilled in the art can understand that, there are numerous technologies for realizing the physical forms corresponding to these mathematical expressions.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A time-domain equalizer, comprising:
a delay circuit, receiving an equalized signal, and accordingly generating M delayed signals, where M is a positive integer greater than 1;
a weighting circuit, adopting M weightings, and applying an $m^{th}$ weighting of the M weightings on an $m^{th}$ delayed signal of the M delay signals to generate an $m^{th}$ weighted signal, where m is an integer index between 1 and M, wherein M weighted signals are generated accordingly;
a controller, iteratively updating the M weightings according to a vector $\vec{e}_{n,p}=[e_{n,p,1} \ldots e_{n,p,M}]$, where $e_{n,p,j}$ is defined as $e_{n,p,j}=\Sigma_k(z[k]*z[k-D_{p,j}]*)$, n represents an iteration index, k represents a sample index, z[k] is a $k^{th}$ sample of the equalized signal, p corresponds to a $p^{th}$ echo signal, j is an integer index between 1 and M, $D_{p,j}$ represents a $j^{th}$ time delay amount corresponding to a $j^{th}$ delayed signal of the M delayed signals, and $z[k-D_{p,j}]*$ represents z[k] delayed by delay $D_{p,j}$; and
summation circuit, summing up the M weighted signals, according to which the equalized signal is updated.

2. The time-domain equalizer according to claim 1, wherein the controller updates the M weightings adopted by the weighting circuit according to an equation:

$$\vec{w}_{n+1,p} = \begin{bmatrix} w_{n+1,p,1} \\ \vdots \\ w_{n+1,p,M} \end{bmatrix} = \begin{bmatrix} w_{n,p,1} \\ \vdots \\ w_{n,p,M} \end{bmatrix} + 2\mu \begin{bmatrix} \vec{e}_{n,p}\vec{z}_{n,p,1}^T \\ \vdots \\ \vec{e}_{n,p}\vec{z}_{n,p,M}^T \end{bmatrix},$$

where $\mu$ represents an adjustable parameter in a least mean square (LMS) algorithm; and the vector $\vec{z}_{n,p,m}$ is:

$$[\Sigma_k z[k-D_{p,m}]*z[k-D_{p,1}]* \ldots \Sigma_k z[k-D_{p,m}]*z[k-D_{p,M}]*],$$

where $D_{p,m}$ represents an $m^{th}$ delay amount.

3. The time-domain equalizer according to claim 1, wherein:
the controller further comprises an adaptive adjusting circuit that determines M parameters $[k_{n,p,1} \ldots k_{n,p,M}]$ according to the M weightings $[w_{n,p,1} \ldots w_{n,p,M}]$; and
the controller updates the M weightings according to an equation:

$$\vec{w}_{n+1,p} = \begin{bmatrix} w_{n+1,p,1} \\ \vdots \\ w_{n+1,p,M} \end{bmatrix} = \begin{bmatrix} w_{n,p,1} \\ \vdots \\ w_{n,p,M} \end{bmatrix} + \mu \begin{bmatrix} k_{n,p,1}\vec{e}_{n,p}\vec{z}_{n,p,1}^T \\ \vdots \\ k_{n,p,M}\vec{e}_{n,p}\vec{z}_{n,p,M}^T \end{bmatrix},$$

where $\mu$ is an adjustable parameter in a least mean square (LMS) algorithm, and the vector $\vec{z}_{n,p,m}$ is:

$$[\Sigma_k z[k-D_{p,m}]*z[k-D_{p,1}]* \ldots \Sigma_k z[k-D_{p,m}]*z[k-D_{p,M}]*],$$

where $D_{p,m}$ represents an $m^{th}$ delay amount.

4. A signal processing method, comprising:
receiving an equalized signal, and accordingly generating M delayed signals, where M is a positive integer;

adopting M weightings, and applying an $m^{th}$ weighting of the M weightings to an $m^{th}$ delayed signal of the M delay signals to generate an $m^{th}$ weighted signal, where m is an integer index between 1 and M;

iteratively updating the M weightings according to a vector $\vec{e}_{n,p}=[e_{n,p,1} \ldots e_{n,p,M}]$, where $e_{n,p,j}$ is defined as $e_{n,p,j}=\Sigma_k(z[k]*z[k-D_{p,j}]*)$, n represents an iteration index, k represents a sample index, z[k] is a $k^{th}$ sample of the equalized signal, p corresponds to a $p^{th}$ echo signal, j is an integer index between 1 and M, $D_{p,j}$ represents a $j^{th}$ time delay amount corresponding to a $j^{th}$ delayed signal of the M delayed signals, and $z[k-D_{p,j}]*$ represents z[k] delayed by delay $D_{p,j}$; and summing up the M weighted signals to update the equalized signal.

5. The signal processing method according to claim 4, wherein the step of iteratively updating the M weightings comprising updating the M weightings according to an equation:

$$\vec{w}_{n+1,p} = \begin{bmatrix} w_{n+1,p,1} \\ \vdots \\ w_{n+1,p,M} \end{bmatrix} = \begin{bmatrix} w_{n,p,1} \\ \vdots \\ w_{n,p,M} \end{bmatrix} + 2\mu \begin{bmatrix} \vec{e}_{n,p} \vec{z}^T_{n,p,1} \\ \vdots \\ \vec{e}_{n,p} \vec{z}^T_{n,p,M} \end{bmatrix}$$

where μ represents an adjustable parameter in a least mean square (LMS) algorithm; and the vector $\vec{z}_{n,p,m}$ is:

$[\Sigma_k z[k-D_{p,m}]*z[k-D_{p,1}]* \ldots \Sigma_k z[k-D_{p,m}]*z[k-D_{p,M}]*]$, where $D_{p,m}$ represents an $m^{th}$ delay amount.

6. The signal processing method according to claim 4, further comprising:

determining the M parameters $[k_{n,p,1} \ldots k_{n,p,M}]$ according to the M weightings $[w_{n,p,1} \ldots w_{n,p,M}]$;

and the step of iteratively updating the M weightings comprises updating the M weightings according to an equation:

$$\vec{w}_{n+1,p} = \begin{bmatrix} w_{n+1,p,1} \\ \vdots \\ w_{n+1,p,M} \end{bmatrix} = \begin{bmatrix} w_{n,p,1} \\ \vdots \\ w_{n,p,M} \end{bmatrix} + \mu \begin{bmatrix} k_{n,p,1} \vec{e}_{n,p} \vec{z}^T_{n,p,1} \\ \vdots \\ k_{n,p,M} \vec{e}_{n,p} \vec{z}^T_{n,p,M} \end{bmatrix}$$

where μ is an adjustable parameter in a least mean square (LMS) algorithm, and the vector $\vec{z}_{n,p,m}$ is:

$[\Sigma_k z[k-D_{p,m}]*z[k-D_{p,1}]* \ldots \Sigma_k z[k-D_{p,m}]*z[k-D_{p,M}]*]$, where $D_{p,m}$ represents an $m^{th}$ delay amount.

\* \* \* \* \*